(12) United States Patent
Kim et al.

(10) Patent No.: US 10,790,503 B2
(45) Date of Patent: Sep. 29, 2020

(54) ANODE FOR LITHIUM SECONDARY BATTERY AND LITHIUM SECONDARY BATTERY INCLUDING THE SAME

(71) Applicant: SK INNOVATION CO., LTD., Seoul (KR)

(72) Inventors: Hyo Sang Kim, Daejeon (KR); Sang Jin Kim, Daejeon (KR); Hae Suk Hwang, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 15/979,599

(22) Filed: May 15, 2018

(65) Prior Publication Data

US 2018/0331354 A1 Nov. 15, 2018

(30) Foreign Application Priority Data

May 15, 2017 (KR) .......................... 10-2017-0059830

(51) Int. Cl.
*H01M 4/36* (2006.01)
*H01M 10/0525* (2010.01)
(Continued)

(52) U.S. Cl.
CPC ........... *H01M 4/366* (2013.01); *H01M 4/133* (2013.01); *H01M 4/587* (2013.01); *H01M 4/622* (2013.01);
(Continued)

(58) Field of Classification Search
CPC ................ H01M 4/366; H01M 4/625; H01M 2004/027; H01M 2004/021; H01M 4/583; H01M 4/587
See application file for complete search history.

(56) References Cited

U.S. PATENT DOCUMENTS

2002/0006551 A1* 1/2002 Ryu ...................... H01M 4/587
429/231.8
2004/0185341 A1* 9/2004 Yamamoto .............. H01M 4/02
429/209
(Continued)

FOREIGN PATENT DOCUMENTS

KR 10-2004-0057416 A 7/2004
KR 10-2005-0004930 A 1/2005
(Continued)

*Primary Examiner* — Ula C Ruddock
*Assistant Examiner* — Matthew W Van Oudenaren
(74) *Attorney, Agent, or Firm* — The PL Law Group, PLLC

(57) ABSTRACT

An anode for lithium secondary battery includes a current collector and an anode active material layer including an anode active material and being formed on the current collector. The anode active material includes a core containing an artificial graphite and a shell formed on a surface of the core, the shell containing an amorphous carbon. An average of a Raman R value of the anode active material layer is in a range from 0.5 to 0.65, and a standard deviation of the Raman R value is less than 0.22. The Raman R value is defined as a ratio $(I_D/I_G)$ of a D band intensity $(I_D)$ relative to a G band intensity $(I_G)$, and the D band and the G band are obtained from a Raman spectrum of the anode active material layer.

10 Claims, 1 Drawing Sheet

(51) Int. Cl.
*H01M 4/133* (2010.01)
*H01M 4/587* (2010.01)
*H01M 4/62* (2006.01)
*H01M 4/02* (2006.01)
*H01M 4/583* (2010.01)

(52) U.S. Cl.
CPC ....... *H01M 4/625* (2013.01); *H01M 10/0525* (2013.01); *H01M 4/583* (2013.01); *H01M 2004/021* (2013.01); *H01M 2004/027* (2013.01)

(56) References Cited

U.S. PATENT DOCUMENTS

| | | | | |
|---|---|---|---|---|
| 2005/0164090 | A1* | 7/2005 | Kim | C01G 1/00 |
| | | | | 429/232 |
| 2009/0217513 | A1* | 9/2009 | Xi | C01G 45/1228 |
| | | | | 29/623.2 |
| 2010/0021820 | A1* | 1/2010 | Ishii | B82Y 30/00 |
| | | | | 429/231.8 |

FOREIGN PATENT DOCUMENTS

| | | |
|---|---|---|
| KR | 10-0597065 B1 | 7/2006 |
| KR | 10-2014-0139355 A | 12/2014 |

\* cited by examiner

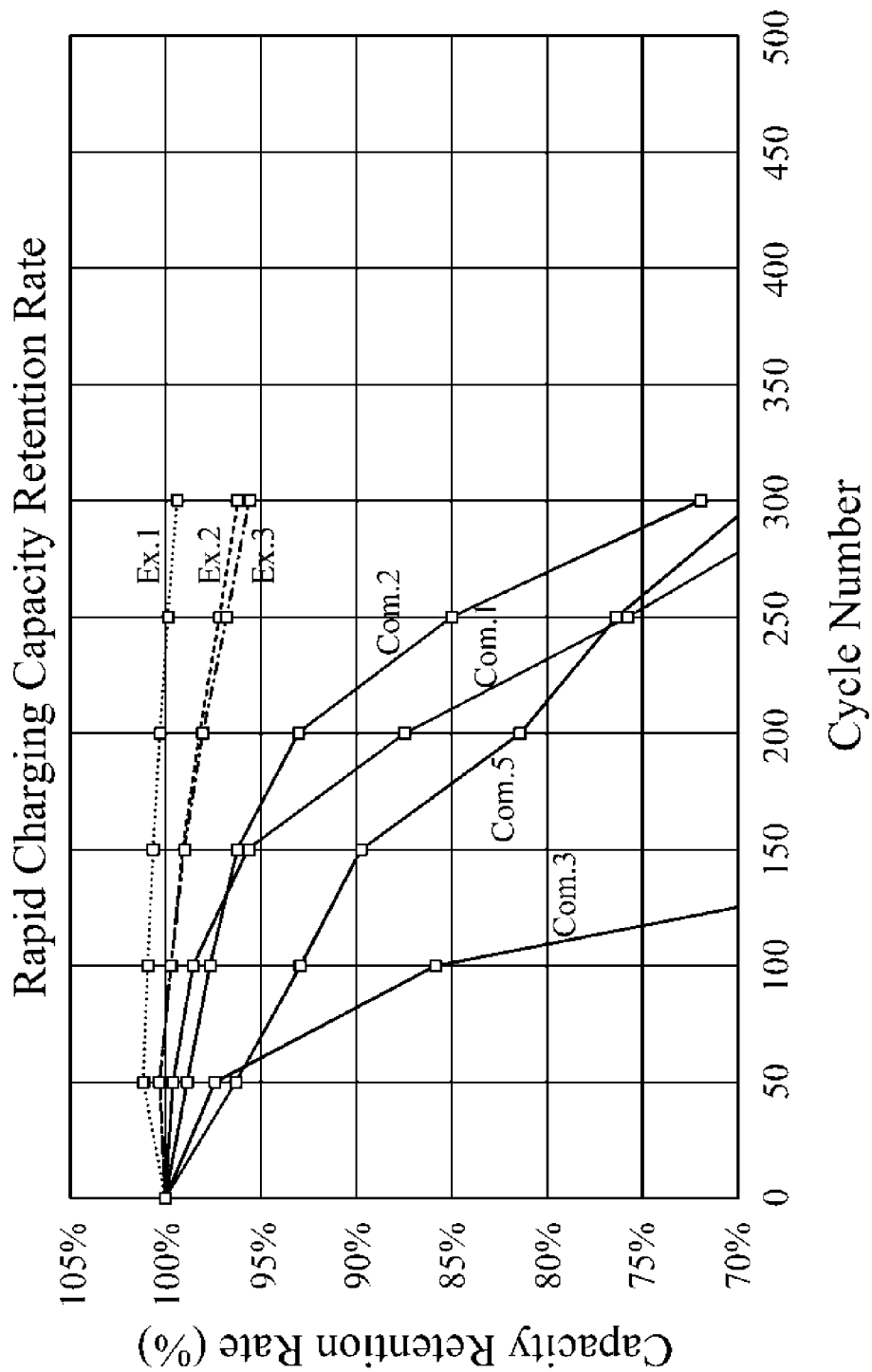

ANODE FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2017-0059830 filed on May 15, 2017 in the Korean Intellectual Property Office (KIPO), the entire disclosure of which is incorporated by reference herein.

BACKGROUND

1. Field

The present invention relates to an anode for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, the secondary battery is being developed and applied as an eco-friendly power source of an electric automobile, an uninterruptible power supply, an artificial satellite, etc.

For example, a lithium secondary battery may include an anode formed of a carbon-based material capable of absorbing and discharging lithium ions, a cathode formed of a lithium-containing oxide, and a non-aqueous electrolyte containing a mixed organic solvent and lithium salts dissolved therein.

An anode active material may include an amorphous carbon or a crystalline carbon. The crystalline carbon that may include a natural carbon or an artificial carbon may be advantageous due to high capacity.

The artificial carbon may have a high charging/discharging efficiency, however may have relatively low capacity.

For example, Korean Publication of Patent Application No. 10-2005-0004930 discloses an anode active material including the artificial carbon which may not have sufficient discharging capacity and power output.

SUMMARY

According to an aspect of the present invention, there is provided an anode for lithium secondary battery having improved power output, life-span and high temperature storage property.

According to an aspect of the present invention, there is provided a lithium secondary battery including the anode for lithium secondary battery.

According to exemplary embodiments, an anode for lithium secondary battery comprises a current collector and an anode active material layer including an anode active material and being formed on the current collector. The anode active material includes a core containing an artificial graphite and a shell formed on a surface of the core, the shell containing an amorphous carbon. An average of a Raman R value of the anode active material layer is in a range from 0.5 to 0.65, and a standard deviation of the Raman R value is less than 0.22. The Raman R value is defined as a ratio $(I_D/I_G)$ of a D band intensity $(I_D)$ relative to a G band intensity $(I_G)$, and the D band and the G band are obtained from a Raman spectrum of the anode active material layer.

In some embodiments, the average and the standard deviation of the Raman R value may be calculated from a probability density function derived by a normalization with respect to a frequency distribution graph of the Raman R value.

In some embodiments, the G band intensity may be a peak intensity with respect to a wave number region from 1,540 $cm^{-1}$ to 1,620 $cm^{-1}$, and the D band intensity may be a peak intensity with respect to a wave number region from 1,300 $cm^{-1}$ to 1,420 $cm^{-1}$.

In some embodiments, the amorphous carbon may be at least one selected from a group consisting of a coal-based pitch, an oil-based pitch, polyvinyl chloride, a mesophase pitch, tar, a low molecular weight intermediate crude oil, citric acid, stearic acid, sucrose, polyvinylidene fluoride, carboxymethyl cellulose, hydroxypropyl cellulose, a recycled cellulose, polyvinyl pyrrolidone, polyethylene, polypropylene, ethylene-propylene-diene monomer (EPDM), polyacrylic acid, polyacrylonitrile, glucose, gelatin, a phenol resin, a naphthalene resin, a polyamide resin, a furan resin, a polyvinyl alcohol resin, a polyimide resin, a cellulose resin, a styrene resin and an epoxy resin, In some embodiments, an amount of the shell may be in a range from about 0.5 wt % to about 10 wt % based on a total weight of the core and shell.

In some embodiments, the core may include a secondary particle formed from a primary particle containing the artificial graphite.

In some embodiments, an average diameter ($D_{50}$) of the primary particle may be in a range from about 5 µm to about 15 µm, and an average diameter ($D_{50}$) of the secondary particle may be in a range from about 10 µm to about 25 µm.

In some embodiments, a density of the anode active material layer may be about 1.45 $g/cm^3$ or more.

In some embodiments, the anode active material layer may further include a binder, and an amount of the binder may be about 3 wt % or less based on a total weight of the anode active material and the binder.

According to exemplary embodiments, a lithium secondary battery comprises the anode for lithium secondary battery as described above, a cathode and a separator interposed between the anode and the cathode.

According to exemplary embodiments, an anode for lithium secondary battery may have improved charging/discharging power output and rapid charging power. Further, the lithium secondary battery including the anode for lithium secondary battery may have improved life-span and high temperature storage property.

BRIEF DESCRIPTION OF THE DRAWINGS

FIG. 1 is a graph showing a capacity retention rate depending on a cycle number of lithium secondary batteries according to Examples and Comparative Examples.

DETAILED DESCRIPTION

According to example embodiments of the present invention, an anode for lithium secondary battery formed of an anode active material that may include a core containing an artificial carbon and a shell including an amorphous carbon on a surface of the core is provided. An average of a Raman R value ($I_D/I_G$) of the anode active material may be in a range from about 0.5 to about 0.65, and a standard deviation of the Raman R value is less than about 0.22. A lithium secondary battery including the anode may have improved charging/discharging power output and rapid charging power output without degrading life-span and high temperature storage property.

Hereinafter, the present invention will be described in detail with reference to exemplary embodiments. However, those skilled in the art will appreciate that such embodiments are provided to further understand the spirit of the present invention and do not limit subject matters to be protected as disclosed in the detailed description and appended claims.

Anode for Lithium Secondary Battery

If a natural graphite is used as an anode active material, a filter clogging may occur during a mixing process and a slurry dispersive property may be degraded. However, an artificial graphite may be relatively free of the problems above, and may have improved life-span and high temperature storage property compared to those of the natural graphite The artificial graphite used as an anode active material of a lithium secondary battery may include a multi-layered structure having a plurality of layers, and lithium ions may be inserted and isolated between the plurality of the layers so that charging and discharging operations may be performed. In this case, the insertion and isolation of the lithium ions may occur along a layer direction of the artificial graphite, and thus a power output may be limited.

Accordingly, the lithium secondary battery in accordance with exemplary embodiments may include an anode active material including a core and a shell formed on a surface of the core. The core may include an artificial graphite, and the shell may include an amorphous carbon. An average of a Raman R value $(I_D/I_G)$ of the anode active material may be in a range from about 0.5 to about 0.65, and a standard deviation of the Raman R value is less than about 0.22. Thus, a thickness uniformity of the shell coated on the core may be improved, and a power output of the lithium secondary battery may be increased without degrading life-span and high temperature storage property.

If the standard deviation is 0.22 or more, the thickness uniformity of the shell may become poor and the power output may not be sufficiently increased. The average of the Raman R value $(I_D/I_G)$ may not be in the above range, the power output may be degraded. For example, the average of the Raman R value is less than about 0.5, the power output may not be sufficiently improved and a long-term stability of a battery cell may be deteriorated due to an irregular coating of the shell. The average of the Raman R value exceeds about 0.65, the irregular coating may be caused due to a coating aggregation.

If the shell containing the amorphous carbon is uniformly coated on the surface of the core, the insertion and isolation of the lithium ions to the anode may occur in all directions of the anode active material so that a power output property of the battery such as charging/discharging power and rapid charging may be enhanced.

If a surface shape of the core is not uniform, a coating uniformity may be more critical to the power output property. The coating uniformity of the shell may be defined by the standard deviation of the Raman R value.

In exemplary embodiments, the average and the standard deviation of the Raman R value may be measured as described below.

An anode active material layer including the anode active material may be formed, and a Raman spectroscopy analysis may be performed at 100 points or more (e.g., 100 to 5,000 points, a confidence becomes higher as the number of the points increases) of the anode active material layer. The Raman R value $(I_D/I_G)$ which is a ratio of a D band intensity relative to a G band intensity is measured to obtain a frequency distribution graph. A normalization with respect to the frequency distribution graph by a Gaussian fitting according to Equation 1 below may be conducted to obtain a probability density function of the Raman R value $(I_D/I_G)$. The average and the standard deviation of the Raman R value $(I_D/I_G)$ may be calculated from the probability density function.

The G band intensity is a peak intensity with respect to a wave number region from about 1,540 cm$^{-1}$ to about 1,620 cm$^{-1}$ in a Raman spectrum. The D band intensity is a peak intensity with respect to a wave number region from about 1,300 cm$^{-1}$ to about 1,420 cm$^{-1}$ in the Raman spectrum.

$$y = a_0 \exp\left[-\ln(2)\left(\frac{x-a_1}{a_2}\right)^2\right] \quad \text{[Equation 1]}$$

In the Equation 1 above, x represents the Raman R value $(I_D/I_G)$, $a_0$ represents an amplitude coefficient, $a_1$ represents a maximum Raman R value $(I_D/I_G)$ in a graph according to the Equation 1, and $a_2$ represents a full width at half max (FWHM) of the graph.

In an embodiment of the present invention, the average of the Raman R value $(I_D/I_G)$ of the anode active material (or the anode active material layer) may be in a range from about 0.55 to about 0.60. The average of the Raman R value $(I_D/I_G)$ may represent a parameter of a relative thickness of the shell. Within the range of the average of the Raman R value $(I_D/I_G)$, life-span and power output of the battery may be further enhanced.

In an embodiment of the present invention, the standard deviation of the Raman R value $(I_D/I_G)$ of the anode active material (or the anode active material layer) may be less than about 0.20, and may represent a parameter relating to the thickness uniformity of the shell. Within this range, life-span and power output of the battery or an electrode may be further enhanced.

In exemplary embodiments, the Raman spectroscopy analysis may be conducted as follows: An active material including a core and a shell on a surface of the core may be prepared (S1). An active material layer including the active material may be formed on at least one surface of a current collector (S2). A Raman spectrum of the active material layer may be achieved, and a Raman R value $(I_D/I_G)$ may be calculated therefrom (S3). A frequency distribution graph of the Raman R value may be obtained (S4). A normalization of the frequency distribution graph may be conducted to obtain a probability density function (S5). The average and the standard deviation of the Raman R value $(I_D/I_G)$ may be calculated from a graph of the probability density function to evaluate the shell (S6).

For example, the Raman spectroscopy analysis may be performed using a Raman spectrometer commonly known in the art.

For example, in the Raman spectrometer, a specific region may be selected at a surface of the anode active material layer, and a Raman mapping may be performed at the selected region using the Raman spectrometer.

As described above, 100 to 5000 regions may be randomly selected at the surface of the anode active material layer to perform the Raman spectroscopy analysis, and an area of each region may be about (30 μm to 50 μm)×(30 μm to 75 μm).

For example, a mapping interval of the Raman mapping may be set as about 1 μm to about 10 μm along an x-axis direction, and about 1 μm to about 5 μm along a y-axis direction.

For example, a laser wavelength of the Raman spectrometer may be in a range from about 532 nm to about 785 nm, a laser power may be in a range from about 5 mW to about 90 mW, a laser exposure time may be in a range from about 3 seconds to about 20 seconds, and a scan number may be 1 to 5.

Carbon atoms forming the core and the shell included in the active material may exist in at least one bond structure. The bond structure may include a hexagonal system by sp2 bond in which one carbon atom is combined with adjacent 3 carbon atoms in the same plane by a bond angle of about 120°. The bond structure may also include a tetrahedron system by sp3 bond in which one carbon atom is combined with adjacent 4 carbon atoms in a bond angle of about 109.5°.

The G band is a peak commonly observed in a graphite based material, and may be observed when the carbon atoms in the hexagonal system are present. The D band is generated by a symmetrical vibration mode, and is not observed in a perfect lattice structure. For example, the D band may be observed when the hexagonal system is not widespread or has defects therein.

The core included in the active material may contain the crystalline carbon and the shell may include the amorphous carbon as described above. A bond structure of carbon atoms in the core is different from that of the shell in a ratio of structures by sp2 bond and other bonds. Thus, the G band intensities and the D band intensities measured in the core and the shell may be different from each other.

Thus, if a thickness or a uniformity of the shell is changed, the Raman R value ($I_D/I_G$) may be also changed.

In the evaluation method as mentioned above, the frequency distribution graph may be obtained. For example, the frequency distribution graph may be a histogram.

For example, data of the Raman R value may be classified by a class interval of about 0.01 to about 0.02, and a frequency of each class may be counted to obtain a frequency distribution table. The frequency distribution graph may be obtained from the frequency distribution table.

In the evaluation method, a normalization may be performed with respect to the frequency distribution graph to obtain a probability density function. When obtaining the probability density function, the normalization may be performed using a Kernel density estimation (KDE) method to obtain the probability density function.

The Kernel density estimation is one of non-parametric density estimation methods by a normalization using a predetermined Kernel function. The Kernel function may include a non-negative function having an integral value of 1 and being symmetrical with respect to a center thereof. For example, a Gaussian function may be utilized as the Kernel function.

As described above, the normalization may be performed by the Gaussian fitting according to the Equation 1 below.

$$y = a_0 \exp\left[-\ln(2)\left(\frac{x-a_1}{a_2}\right)^2\right] \quad \text{[Equation 1]}$$

In the Equation 1 above, x represents the Raman R value ($I_D/I_G$), $a_0$ represents an amplitude coefficient, $a_1$ represents a maximum Raman R value ($I_D/I_G$) in a graph according to the Equation 1, and a2 represents a full width at half max (FWHM) of the graph.

In the Equation 1 above, a1 may represent a maximum value of the probability density function, and the Raman R value representing the maximum value may be a Raman R value corresponding to a median of the probability density function.

The average of the Raman R value ($I_D/I_G$) may be utilized as an indicator of a relative thickness of the shell included in the anode active material, and/or the standard deviation of the Raman R value ($I_D/I_G$) may be utilized as an indicator of a relative uniformity of the shell thickness included in the anode active material. However, an absolute shell thickness or an absolute uniformity of the shell thickness (e.g., a roughness) may not be obtained from the average and the standard deviation of the Raman R value ($I_D/I_G$).

A thickness may indicate a width between two facing surfaces, and a uniformity of the thickness may indicate, e.g., a roughness of the shell surface.

For example, in an evaluation of active materials having different shell thicknesses, the averages of the Raman R values ($I_D/I_G$) derived from the method as mentioned above may be compared with each other to evaluate a relative thickness included in each active material. As the average of the Raman R value ($I_D/I_G$) becomes smaller, the shell thickness may be determined as being smaller. As the average of the Raman R value ($I_D/I_G$) becomes greater, the shell thickness may be determined as being greater.

In an evaluation of active materials having different uniformity or roughness of the shell thickness, the standard deviations derived as mentioned above may be compared with each other to evaluate a relative uniformity or roughness of each shell thickness included in each active material. As the standard deviation becomes narrower, the uniformity or roughness of the shell thickness may be determined as being improved or smaller. As a width of a peak becomes wider, the uniformity of the shell thickness may be determined as being poor and the roughness of the shell thickness may be determined as being greater.

In an embodiment, when the active material includes at least two core-shell particles having different shell thicknesses and/or the uniformities of the shell thickness, a probability density function including at least two peaks may be obtained. In this case, the average of the Raman R value ($I_D/I_G$) and the standard deviation of each peak may be individually obtained.

Accordingly, even though the active material includes at least two core-shell particles having different thickness properties as mentioned above, one active material layer including the at least two core-shell particles and the thickness properties may be easily evaluated by a single evaluation method without forming an individual active material layer per each core-shell particle and evaluating individually each active material layer.

For example, if the active material includes two core-shell particles having different shell thicknesses and the same uniformity, a probability density function having two peaks may be obtained. The two peaks may have different averages of the Raman R value, and may have the same width at the same y-axis value or the same height.

For example, if the active material includes two core-shell particles having different uniformities and the same shell thickness, a probability density function having two peaks may be obtained. The two peaks may have different widths at the same y-axis value or the same height, and may have the same average of the Raman R value.

For example, if the active material includes two core-shell particles having different uniformities and shell thicknesses, a probability density function having two peaks may be obtained. The two peaks may have different widths at the same y-axis value or the same height, and different averages of the Raman R value.

The anode active material according to exemplary embodiments may include a core containing an artificial graphite, and a shell formed on a surface of the core and containing an amorphous carbon.

The shell may be a coating layer formed on the core. The shell may include the amorphous carbon, and the amorphous carbon may include a soft carbon and/or a hard carbon.

The soft carbon may include, e.g., a coal-based pitch, an oil-based pitch, polyvinyl chloride, a mesophase pitch, tar, a low molecular weight intermediate crude oil, etc. These may be used alone or in a combination thereof.

The hard carbon may include, e.g., citric acid, stearic acid, sucrose, polyvinylidene fluoride, carboxymethyl cellulose, hydroxypropyl cellulose, a recycled cellulose, polyvinyl pyrrolidone, polyethylene, polypropylene, ethylene-propylene-diene monomer (EPDM), polyacrylic acid, polyacrylonitrile, glucose, gelatin, a phenol resin, a naphthalene resin, a polyamide resin, a furan resin, polyvinyl alcohol resin, a polyimide resin, a cellulose resin, a styrene resin, an epoxy resin, etc. These may be used alone or in a combination thereof.

For example, an average thickness of the shell may be in a range from about 5 nm to about 100 nm.

An amount of the shell may be in a range from about 0.5 wt % to about 10 wt % based on a total weight of the core and the shell.

The core may include the artificial graphite. For example, an average diameter ($D_{50}$) of the core may be in a range from about 7 μm to about 30 μm.

In some embodiments, the core may include a secondary particle having an average diameter from about 10 μm to 25 μm which may be formed from primary particles each having an average diameter from about 5 μm to about 15 μm. The primary particle may include an artificial graphite, and I(110)/I(002) of the secondary particle may be in a range from 0.0075 to 0.0120.

The core may be used together with the shell as described above, long life-span and high temperature storage property of the battery may be achieved while also improving power output property. The artificial graphite having improved press property may be applied to increase an energy density of the battery.

Within the average diameter range of the primary particle, a production yield the life-span of the battery may be enhanced, and a size control of the secondary particle may be easily implemented.

A plurality of the primary particles may be agglomerated to form the secondary particle. The number of the primary particles for forming the secondary particle may not be specifically limited. For example, 3 to 9 primary particles may be assembled to form the secondary particle.

The average diameter of the secondary particle may be within the above range so that a pore size generated during a fabrication of the electrode may be properly adjusted. Thus, an impregnation of the electrode may be facilitated, and a thickness of the electrode may be easily controlled.

For example, the average diameter of the primary particle may be in a range from about 7 μm to about 10 μm so that the power output may be enhanced while minimizing a reduction of life-span and high temperature storage property.

The average diameter of the secondary particle may be in a range from about 13 μm to about 20 μm to be effectively employed to the electrode.

An orientation of each primary particle of the artificial graphite may be randomly distributed so that lithium ions may easily pass through the artificial graphite. According to exemplary embodiments, an orientation of the particle may be adjusted so that the power output of the battery may be further improved.

The orientation of the particle may be determined by an X-ray diffraction (XRD) analysis. For example, an incident X-ray of a specific wavelength λ may generate diffraction peaks of different intensities at a specific incident angle θ or a diffraction angle 2θ, and a ratio of the peaks may be calculated to determine the orientation of the particle.

I(002) indicates an intensity (height) of a peak near a position at which 2θ=26.5 in the XRD analysis, I(110) indicates an intensity (height) of a peak near a position at which 2θ=77.5 in the XRD analysis, and I(110)/I(002) indicates a ratio of the intensities XRD measuring conditions commonly used in the related art may be employed in the XRD analysis. For example, the conditions as listed below may be used.

X-ray: Cu K alpha, K-Alpha1 wavelength: 1.540598 Å
Generator voltage: 40 kV Tube current: 30 mA
Scan Range: 10~80 Scan Step Size: 0.026
Ni filter, Soller slit (0.04 rad, 2 ea.), Diffracted antiscatter slit 7.5 mm
Divergence slit: ¼° Antiscatter slit: ½°
Time per step: 100 s In some embodiments, I(110)/I(002) of the secondary particle may be in a range from about 0.0075 to about 0.0120 to further improve the power output of the battery. For example, I(110)/I(002) of the secondary particle may be in a range from about 0.0075 to 0.0100 from an aspect of further improving a charging/discharging power.

If I(110)/I(002) is less than about 0.0075, the anode active material may not be easily formed, and an electrochemical property such as a capacity of the artificial graphite may be degraded due to excessive control of particle shape and size.

A shape of the primary particle may not be specifically limited. For example, the primary particle may have a spherical shape or a plate shape to facilitate absorbing and discharging lithium ions.

The anode active material may be mixed with a solvent, and optionally with a binder, a conductive agent, a dispersive agent, etc., to form a mixture. The mixture may be coated on a metal current collector by, e.g., a spray coating or an immersing coating, and pressed and dried to form the anode for lithium secondary battery.

The solvent may include a non-aqueous solvent, e.g., N-methyl-2-pyrrolidone (NMP), dimethyl formamide, dimethyl acetamide, N,N-dimethyl amino propyl amine, ethylene oxide, tetrahydrofuran, etc.

The binder may include an organic binder such as a copolymer of vinylidenefluoride and hexafluoropropylene (PVDF-co-HFP), polyvinylidenefluoride (PVDF), polyacrylonitrile, polymethylmethacrylate, etc., or an aqueous binder such as styrene-butadiene rubber (SBR) that may be used with a thickening agent such as carboxymethyl cellulose (CMC).

An amount of the binder may be properly adjusted for forming the electrode and improving a resistance property. For example, the amount of the binder may be about 3 wt % or less based on a total weight of the anode active material and the binder. A lower limit of the binder may not be specifically limited, e.g., may be about 0.5 wt % or about 1 wt % based on the total weight of the anode active material and the binder.

For example, a conductive carbon-based material may be used as the conductive agent.

The metal current collector may include a metal having a high conductivity which may not be reactive within a voltage range of the battery and may be easily coated with a mixture of the anode active material or a cathode active material. For example, copper or a copper alloy; stainless steel, nickel, aluminum, titanium or an alloy thereof; or copper or stainless steel which may be surface-treated by carbon, nickel, titanium, silver, etc., may be used as the anode current collector.

In an embodiment, an electrode density of the anode active material layer formed from the anode active material may be about 1.43 g/cm³ or more, and an upper limit of the electrode density may not be specifically limited. Within the above range, power output, life-span and high temperature storage property of the electrode or the battery may be enhanced.

Lithium Secondary Battery

The lithium secondary battery according to exemplary embodiments may include an anode formed from the anode active material as described above, a cathode and a separator interposed between the cathode and the anode.

For example, an electrode assembly including the anode, the cathode and the separator may be housed in a battery case, and an electrolyte may be injected to obtain the lithium secondary battery.

Cathode

A cathode active material commonly known in the related art may be used to form a cathode.

The cathode active material may be coated on a cathode current collector to form the cathode.

The cathode current collector may include stainless steel, nickel, aluminum, titanium or an alloy thereof; or aluminum or stainless steel which may be surface-treated by carbon, nickel, titanium, silver, etc.

The cathode active material commonly used in the related art may be used. For example, a complex oxide of lithium and at least one of cobalt, manganese and nickel such as compound as listed below may be used.

$Li_xMn_{1-y}M_yA_2$
$Li_xMn_{1-y}M_yO_{2-z}X_z$
$Li_xMn_2O_{4-z}X_z$
$Li_xMn_{2-y}M_yM'_zA_4$
$Li_xCo_{1-y}M_yA_2$
$Li_xCo_{1-y}M_yO_{2-z}X_z$
$Li_xNi_{1-y}M_yA_2$
$Li_xNi_{1-y}M_yO_{2-z}X_z$
$Li_xNi_{1-y}Co_yO_{2-z}X_z$
$Li_xNi_{1-y-z}Co_yM_zA_\alpha$
$Li_xNi_{1-y-z}Co_yM_zO_{2-\alpha}X_\alpha$
$Li_xNi_{1-y-z}Mn_yM_zA_\alpha$
$Li_xNi_{1-y-z}Mn_yM_zO_{2-\alpha}X$ In the chemical formulae above, $0.9 \leq x \leq 1.1$, $0 \leq y \leq 0.5$, $0 \leq z \leq 0.5$, $0 \leq \alpha \leq 2$, M and M' are the same as or different from each other, and may be selected from Mg, Al, Co, K, Na, Ca, Si, Ti, Sn, V, Ge, Ga, B, As, Zr, Mn, Cr, Fe, Sr, V or a rare earth metal, A may be selected from O, F, S or P, and X may be selected from F, S or P.

The cathode active material may be mixed with a solvent, and optionally with a binder, a conductive agent, a dispersive agent, etc., to form a mixture. The mixture may be coated on the cathode current collector coating, and pressed and dried to form the cathode.

The solvent may include a non-aqueous solvent, e.g., N-methyl-2-pyrrolidone (NMP), dimethyl formamide, dimethyl acetamide, N,N-dimethyl amino propyl amine, ethylene oxide, tetrahydrofuran, etc.

The binder may include an organic binder such as a copolymer of vinylidenefluoride and hexafluoropropylene (PVDF-co-HFP), polyvinylidenefluoride (PVDF), polyacrylonitrile, polymethylmethacrylate, etc., or an aqueous binder such as styrene-butadiene rubber (SBR) that may be used with a thickening agent such as carboxymethyl cellulose (CMC).

A conductive carbon-based material may be used as the conductive agent.

Separator

The separator may include a porous polymer film. For example, a polyolefin-based polymer including at least one of ethylene homopolymer, propylene homopolymer, ethylene/butene copolymer, ethylene/hexene copolymer or ethylene/methacrylate copolymer may be used. A conventional porous non-woven fabric, a glass having a high melting point, a polyethylene terephthalate fiber may be also used in the separator. The separator may be applied in the battery by winding, laminating, stacking, folding, etc., with the electrodes.

Non-Aqueous Electrolyte

A non-aqueous electrolyte may include a lithium salt and an organic solvent.

The lithium salt commonly used in an electrolyte for lithium secondary battery may be used, and may be represented as $Li^+X^-$.

Non-limiting examples of an anion of the lithium salt may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent commonly used in the electrolyte for lithium secondary battery may be used. Non-limiting examples of the organic solvent may include propylene carbonate (PC), ethylene carbonate (EC), diethyl carbonate (DEC), dimethyl carbonate (DMC), ethyl methyl carbonate (EMC), methyl propyl carbonate, dipropyl carbonate, fluoro ethylene carbonate (FEC), dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

The non-aqueous electrolyte may be injected to the electrode assembly including the cathode, the anode and the separator interposed therebetween to form the lithium secondary battery.

The lithium secondary battery may be fabricated as, e.g., a cylindrical shape using a can, a pouch shape or a coin shape.

Hereinafter, exemplary embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

Example 1

<Anode>

An artificial graphite was pulverized using cokes and a collisional crusher to form primary particles having an average diameter $D_{50}$ of 7.2 μm.

The primary particles were assembled using pitch to form a secondary particle, and thermally treated at 3,000° C. to form a core where $D_{50}$=15.3 µm, La(100)=23, Lc(002)=21, I(110)/I(002)=0.0084.

The core prepared above and a solid binder pitch having a softening point of 250° C. or more were blended by a ratio of 100:10, and then mechanically mixed in a high speed agitator at 2,200 rpm for 10 minutes to form a mixture. The mixture was fired in an electric furnace by raising a temperature from 25° C. to 1,100° C. in 2 hours, and maintaining at 1,100° C. for 1 hour to form a shell on a surface of the core and obtain an anode active material as a core-shell particle.

The anode active material as prepared above, styrene butadiene rubber (SBR) and carboxy methyl cellulose (CMC) as a thickening agent were mixed by a weight ratio of 97.8:1.2:1.0, and then dispersed in a distilled water to form a mixture. The mixture was coated on a surface of a Cu-foil current collector, and then dried and pressed to form an anode active material layer having a size of 10 cm×10 cm×50 µm and an electrode density of 1.50±0.05 g/cm³.

<Cathode>

$Li_{1.0}Ni_{0.6}Co_{0.2}Mn_{0.2}O_2$ as a cathode active material, Denka Black as a conductive additive, polyvinylidene fluoride as a binder and N-Methyl pyrrolidone as a solvent were mixed by a weight ratio of 46:2.5:1.5:50 to form a cathode mixture. The cathode mixture was coated on an aluminum substrate, and then dried and pressed to form a cathode.

<Lithium Secondary Battery>

The cathode and the anode as prepare above were notched in a proper size and a separator (polyethylene, thickness: 25 µm) was interposed between the cathode and the anode to form an electrode cell. The electrode cells were stacked, and electrode taps of the cathode and the anode were welded to form an electrode assembly.

The electrode assembly was housed in a pouch, and then three sides of the pouch including a side from which the electrode taps protrude except for an electrolyte injecting side were sealed. An electrolyte was injected through the electrolyte injecting side, and impregnated for more than 12 hours after sealing the electrolyte injecting side. The electrolyte was prepared by dissolving 1M $LiPF_6$ in a mixed solvent of ethylene carbonate (EC)/ethyl methyl carbonate (EMC)/diethylene carbonate (DEC), and then adding 1 wt % of vinylene carbonate, 1,3-propensultone (PRS) and 0.5 wt % of lithium bis(oxalato) borate (LiBOB).

A pre-charging was performed with a current of 2.5 A corresponding to 0.25 C for 36 minutes. After 1 hour, a degassing was conducted, an aging was performed for more than 24 hours, and then a formation charging/discharging was performed (Charging condition: CC-CV 0.2C 4.2V 0.05C CUT-OFF, Discharging condition: CC 0.2C 2.5V CUT-OFF)

Subsequently, a standard charging/discharging was performed (Charging condition: CC-CV 0.5 C 4.2V 0.05C CUT-OFF, Discharging condition: CC 0.5C 2.5V CUT-OFF).

Examples 2-8, Comparative Examples 1-6

At least one of an average of a standard deviation of a Raman R value ($I_D/I_G$) and a weight ratio of core and shell was changed to prepare batteries of Examples 2-8 and Comparative Examples 1-6. Specifically, a stirring speed, a firing temperature, a thickness, etc., during a formation of the shell were adjusted to change the average and the standard deviation of the Raman R value ($I_D/I_G$).

The average and the standard deviation of the Raman R value ($I_D/I_G$) and the weight ratio of core and shell in Examples 1-8 and Comparative Examples 1-6 are listed in Table 1 below.

TABLE 1

| | Average of Raman R value ($I_D/I_G$) | Standard Deviation of Raman R value ($I_D/I_G$) | Core:Shell Weight Ratio |
|---|---|---|---|
| Example 1 | 0.58 | 0.18 | 100:10 |
| Example 2 | 0.56 | 0.18 | 100:10 |
| Example 3 | 0.56 | 0.21 | 100:10 |
| Example 4 | 0.58 | 0.18 | 100:20 |
| Example 5 | 0.50 | 0.18 | 100:10 |
| Example 6 | 0.54 | 0.18 | 100:10 |
| Example 7 | 0.61 | 0.18 | 100:10 |
| Example 8 | 0.65 | 0.18 | 100:10 |
| Comparative Example 1 | 0.73 | 0.23 | 100:10 |
| Comparative Example 2 | 0.70 | 0.21 | 100:10 |
| Comparative Example 3 | 0.46 | 0.12 | 100:10 |
| Comparative Example 4 | 0.57 | 0.23 | 100:10 |
| Comparative Example 5 | 0.61 | 0.23 | 100:10 |
| Comparative Example 6 | 0.65 | 0.25 | 100:10 |

Examples 9-14, Comparative Example 7

An type of the core (assembly: a secondary particle formed from primary particles, common artificial graphite and natural graphite), an average diameter ($D_{50}$) of the core, and I(110)/I(002) of the anode active material were changed as listed in Table 2 below to prepare batteries of Examples 9-14 and Comparative Example 7. An average and a standard deviation of the Raman R value ($I_D/I_G$) and a weight ratio of core and shell are shown in Table 3 below.

TABLE 2

| | | Average Diameter (µm) | | |
|---|---|---|---|---|
| | Core Type | Primary Particle | Secondary Particle | I(110)/I(002) |
| Example 9 | Assembly | 7.5 | 17.3 | 0.0108 |
| Example 10 | Common Artificial Graphite (Non-assembly) | 19.0 | — | 0.0126 |
| Example 11 | Assembly | 9.4 | 13.8 | 0.0169 |
| Example 12 | Assembly | 16 | 20 | 0.0110 |
| Example 13 | Assembly | 3 | 12 | 0.0900 |
| Example 14 | Assembly | 12 | 26 | 0.097 |
| Comparative Example 7 | Natural graphite | 11.9 | — | 0.0100 |

TABLE 3

| | Average of Raman R value ($I_D/I_G$) | Standard Deviation of Raman R value ($I_D/I_G$) | Core:Shell Weight Ratio |
|---|---|---|---|
| Example 9 | 0.58 | 0.18 | 100:10 |
| Example 10 | 0.58 | 0.18 | 100:10 |
| Example 11 | 0.58 | 0.18 | 100:10 |
| Example 12 | 0.58 | 0.18 | 100:10 |
| Example 13 | 0.58 | 0.18 | 100:10 |

TABLE 3-continued

| | Average of Raman R value ($I_D/I_G$) | Standard Deviation of Raman R value ($I_D/I_G$) | Core:Shell Weight Ratio |
|---|---|---|---|
| Example 14 | 0.58 | 0.18 | 100:10 |
| Comparative Example 7 | 0.58 | 0.18 | 100:10 |

Experimental Example

A rapid charging property of the lithium secondary batteries according to Examples and Comparative Examples was evaluated
<Evaluation on Rapid Charging Property>
Cells having a large capacity of 10 Ah or more were fabricated using anodes of Example and Comparative Examples and the same cathode. A rapid charging property of the cells was evaluated by a c-rate of 1.4C charging/1C discharging within a DOD90 range in a chamber at a constant temperature (25° C.). After repeating 300 cycles, a rapid charging capacity retention rate was measured. The results are shown in Table 4 below.

TABLE 4

| | 300 cycles Capacity Retention Rate (%) |
|---|---|
| Example 1 | 99.50 |
| Example 2 | 96.40 |
| Example 3 | 96.00 |
| Example 4 | 95.3 |
| Example 5 | 94.1 |
| Example 6 | 94.6 |
| Example 7 | 94.9 |
| Example 8 | 94.5 |
| Example 9 | 97.2 |
| Example 10 | 91.0 |
| Example 11 | 92.0 |
| Example 12 | 95.1 |
| Example 13 | 95.3 |
| Example 14 | 92.0 |
| Comparative Example 1 | 65.0 |
| Comparative Example 2 | 72.4 |
| Comparative Example 3 | 53.0 |
| Comparative Example 4 | 0.0 |
| Comparative Example 5 | 69.7 |
| Comparative Example 6 | 60.3 |
| Comparative Example 7 | 0.0 |

FIG. 1 is a graph showing a capacity retention rate depending on a cycle number of lithium secondary batteries according to Examples and Comparative Examples.

Referring to FIG. 1, reductions of the capacity retention rate (%) depending on a time in the lithium secondary batteries of Examples 1 to 3 (designated as "Ex." in FIG. 1) were smaller than those of Comparative Examples 3 (designated as "Com." in FIG. 1), and improved charging, life-span and power output were achieved.

What is claimed is:

1. An anode for a lithium secondary battery, comprising:
a current collector; and
an anode active material layer comprising an anode active material and being formed on the current collector, the anode active material comprising a core containing an artificial graphite and a shell formed on a surface of the core, the shell containing an amorphous carbon,
wherein an average of a Raman R value of the anode active material layer is in a range from 0.5 to 0.65, and a standard deviation of the Raman R value is less than 0.22, where the Raman R value is defined as a ratio ($I_D/I_G$) of a D band intensity ($I_D$) relative to a G band intensity ($I_G$), and the D band and the G band are obtained from a Raman spectrum of a surface of the anode active material layer; and
the average of the Raman R value and the standard deviation of the Raman R value are calculated from a frequency distribution graph obtained by performing a Raman spectroscopy analysis at 100 points or more of the surface of the anode active material layer.

2. The anode for the lithium secondary battery according to claim 1, wherein the average and the standard deviation of the Raman R value are calculated from a probability density function derived by a normalization with respect to a frequency distribution graph of the Raman R value.

3. The anode for the lithium secondary battery according to claim 1, wherein the G band intensity is a peak intensity with respect to a wave number region from 1,540 $cm^{-1}$ to 1,620 $cm^{-1}$, and the D band intensity is a peak intensity with respect to a wave number region from 1,300 $cm^{-1}$ to 1,420 $cm^{-1}$.

4. The anode for the lithium secondary battery according to claim 1, wherein the amorphous carbon is at least one selected from a group consisting of a coal-based pitch, an oil-based pitch, polyvinyl chloride, a mesophase pitch, tar, a low molecular weight intermediate crude oil, citric acid, stearic acid, sucrose, polyvinylidene fluoride, carboxymethyl cellulose, hydroxypropyl cellulose, a recycled cellulose, polyvinyl pyrrolidone, polyethylene, polypropylene, ethylene-propylene-diene monomer (EPDM), polyacrylic acid, polyacrylonitrile, glucose, gelatin, a phenol resin, a naphthalene resin, a polyamide resin, a furan resin, a polyvinyl alcohol resin, a polyimide resin, a cellulose resin, a styrene resin and an epoxy resin.

5. The anode for the lithium secondary battery according to claim 1, wherein an amount of the shell is in a range from 0.5 wt % to 10 wt % based on a total weight of the core and shell.

6. The anode for the lithium secondary battery according to claim 1, wherein the core includes a secondary particle formed from a primary particle containing the artificial graphite.

7. The anode for the lithium secondary battery according to claim 6, wherein an average diameter ($D_{50}$) of the primary particle is in a range from 5 μm to 15 μm, and an average diameter ($D_{50}$) of the secondary particle is in a range from 10 μm to 25 μm.

8. The anode for the lithium secondary battery according to claim 1, wherein a density of the anode active material layer is 1.45 g/cm³ or more.

9. The anode for the lithium secondary battery according to claim 1, wherein the anode active material layer further includes a binder,
wherein an amount of the binder is 3 wt % or less based on a total weight of the anode active material and the binder.

10. A lithium secondary battery, comprising:
the anode of claim 1;
a cathode; and
a separator interposed between the anode and the cathode.

* * * * *